US011069198B2

(12) United States Patent
Graboyes et al.

(10) Patent No.: US 11,069,198 B2
(45) Date of Patent: Jul. 20, 2021

(54) SKILL-BASED GAMING SYSTEM INCORPORATING OVER-HOLD STORAGE AND MEANS FOR AWARDING THE SAME TO MAINTAIN A SUBSTANTIAL EQUIVALENCE BETWEEN THEORETICAL RTP AND ACTUAL RTP

(71) Applicant: GameCo, LLC, Las Vegas, NV (US)

(72) Inventors: Blaine Goldman Graboyes, Las Vegas, NV (US); Eli Weissman, Brooklyn, NY (US)

(73) Assignee: GAMECO, LLC, Las Vegas, NV (US)

( * ) Notice: Subject to any disclaimer, the term of this patent is extended or adjusted under 35 U.S.C. 154(b) by 0 days.

(21) Appl. No.: 16/559,445

(22) Filed: Sep. 3, 2019

(65) Prior Publication Data

US 2021/0065518 A1 Mar. 4, 2021

(51) Int. Cl.
*G06F 17/00* (2019.01)
*G07F 17/32* (2006.01)

(52) U.S. Cl.
CPC ...... *G07F 17/3295* (2013.01); *G07F 17/3209* (2013.01); *G07F 17/3211* (2013.01); *G07F 17/3258* (2013.01); *G07F 17/3267* (2013.01)

(58) Field of Classification Search
None
See application file for complete search history.

(56) References Cited

U.S. PATENT DOCUMENTS 10,460,565 B2* 10/2019 Vann .................. G07F 17/3258
2006/0040735 A1* 2/2006 Baerlocher ......... G07F 17/3244 463/26
2009/0209331 A1* 8/2009 Soukup ............... G07F 17/3258 463/27
2009/0239662 A1* 9/2009 Bramble ............. G07F 17/3267 463/27
2011/0212766 A1* 9/2011 Bowers ............... G07F 17/3244 463/25
2016/0093160 A1 3/2016 Yee
2016/0093168 A1* 3/2016 Hall .................... A63F 3/00157 463/25
2016/0148467 A1* 5/2016 Snow .................. G07F 17/3293 463/25
2017/0084129 A1* 3/2017 Baerlocher ......... G07F 17/3258
2017/0087443 A1* 3/2017 Milosevich ......... A63F 3/00157
2017/0213424 A1* 7/2017 Arnone ............... G07F 17/3225
(Continued)

FOREIGN PATENT DOCUMENTS

WO 2015168749 A1 11/2015

OTHER PUBLICATIONS

International Search Report and Written Opinion dated Feb. 3, 2021 for PCT/US2020/058591 (8 pages).

*Primary Examiner* — Paul A D'Agostino
(74) *Attorney, Agent, or Firm* — FisherBroyles, LLP; Rob L. Phillips

(57) ABSTRACT

A system and method for operating a skilled-based casino-style video game with an over-hold pool formed of a chance pool and skill pool. Both the chance pool and skill pool being funded by prizes/awards not awarded based on less-than optimal skilled play. Awards from the chance pool and skill pool serve to ensure that actual RTP converges with theoretical RTP as well as ensuring the minimum percentage requirements are met under recognized standards related to gaming devices in casinos.

28 Claims, 21 Drawing Sheets

(56) References Cited

U.S. PATENT DOCUMENTS

| | | | | |
|---|---|---|---|---|
| 2017/0330420 | A1* | 11/2017 | Merati | G07F 17/3244 |
| 2017/0337776 | A1* | 11/2017 | Herring | A63F 13/35 |
| 2018/0047253 | A1* | 2/2018 | Vann | G07F 17/3262 |
| 2019/0096182 | A1* | 3/2019 | Oberberger | G07F 17/3286 |
| 2019/0102993 | A1* | 4/2019 | Washington | G07F 17/3295 |
| 2019/0147697 | A1* | 5/2019 | Penacho | G07F 17/3211<br>463/25 |
| 2019/0156634 | A1 | 5/2019 | Bridges et al. | |

* cited by examiner

450

450

700-1

| 705<br>Threshold Value of GEM | 710<br>GEM Payout |
|---|---|
| Less than $10.00 | 0% of GEM |
| Greater than $10.00 | 5% of GEM |
| Greater than $20.00 | 10% of GEM |
| Greater than $50.00 | 20% of GEM |

Fig. 11A 700-2

715-1 720-1 725-1

| Paytable A – $1.00 Bet / 90% RTP | | | |
|---|---|---|---|
| MULTIPLIER | WEIGHT | PAY | RTP |
| 0.00 | 60.00% | $0.00 | 0.00% |
| 0.50 | 8.00% | $0.50 | 4.00% |
| 1.00 | 9.00% | $1.00 | 9.00% |
| 1.50 | 10.00% | $1.50 | 15.00% |
| 2.00 | 6.00% | $2.00 | 12.00% |
| 5.00 | 4.00% | $5.00 | 20.00% |
| 10.00 | 3.00% | $10.00 | 30.00% |
| TOTAL | 100.00% | | 90.00% |

700-3

715-2 720-2 725-2

| Paytable B – $1.00 Bet / 95% RTP | | | |
|---|---|---|---|
| MULTIPLIER | WEIGHT | PAY | RTP |
| 0.00 | 55.00% | $0.00 | 0.00% |
| 0.50 | 8.00% | $0.50 | 4.00% |
| 1.00 | 14.00% | $1.00 | 14.00% |
| 1.50 | 10.00% | $1.50 | 15.00% |
| 2.00 | 6.00% | $2.00 | 12.00% |
| 5.00 | 4.00% | $5.00 | 20.00% |
| 10.00 | 3.00% | $10.00 | 30.00% |
| TOTAL | 100.00% | | 95.00% |

Fig. 11B 700-4

| 715-3 | 720-3 | | 725-3 |
|---|---|---|---|
| **Paytable C – $1.00 Bet / 100% RTP** | | | |
| **MULTIPLIER** | **WEIGHT** | **PAY** | **RTP** |
| 0.00 | 50.00% | $0.00 | 0.00% |
| 0.50 | 8.00% | $0.50 | 4.00% |
| 1.00 | 19.00% | $1.00 | 19.00% |
| 1.50 | 10.00% | $1.50 | 15.00% |
| 2.00 | 6.00% | $2.00 | 12.00% |
| 5.00 | 4.00% | $5.00 | 20.00% |
| 10.00 | 3.00% | $10.00 | 30.00% |
| **TOTAL** | **100.00%** | | **100.00%** |

Fig. 11C

SKILL-BASED GAMING SYSTEM INCORPORATING OVER-HOLD STORAGE AND MEANS FOR AWARDING THE SAME TO MAINTAIN A SUBSTANTIAL EQUIVALENCE BETWEEN THEORETICAL RTP AND ACTUAL RTP

FIELD OF THE INVENTION

The embodiments of the present invention relate to a gaming system and method for incorporating over-hold storage related to amounts not won due to non-optimal play, and awarding the over-hold amounts in a manner to balance the theoretical RTP and actual RTP.

BACKGROUND

Gaming jurisdictions employ theoretical return to player (RTP) to control gaming machine payouts to players. That is, each game shall reliably payout to a set RTP, above a pre-established minimum (e.g., 75%). Skill-based games must abide by the same regulations as non-skilled games. Managing RTP with skill-based games is more challenging than with gaming devices that rely solely on a traditional random number generator (RNG).

Casinos derive much of their revenue from slot machines, but younger players do not tend to play traditional slot machines (i.e., non-interactive, reel-based games using RNGs to generate outcomes). Therefore, as the player demographic continues to trend younger, skill-based gaming is seen as an attractive alternative.

Accordingly, the new gaming system and method detailed herein manages the RTP of skill-based games by storing amounts not won due to non-optimal play in an over-hold pool. The amounts in the over-hold pool may be aggregated in a skill pool, a chance pool or both which are then distributed based on ranges defined by trigger and threshold amounts.

SUMMARY

In one embodiment of the present invention, a gaming machine comprises: at least a processor running executable instructions related to running a skill-based casino game; a display; a user interface; memory in communication with said processor; and wherein said processor running said executable instructions: (i) monitors actual skill play against optimal skill play; (ii) maintains an over-hold pool of funds related to prizes not awarded due to less than optimal skill play; (iii) awards a portion of said over-hold pool based on randomness; (iv) awards a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

One method embodiment of the present invention comprises utilizing a processor running executable instructions to run a casino game on a gaming machine including a display, user interface, and memory in communication with said at least one processor; via said processor, (i) comparing actual skill play to optimal skill play; (ii) maintaining an over-hold pool of funds related to monies not awarded due to less than optimal skill play; (iii) awarding a portion of said over-hold pool based on randomness; (iv) awarding a portion of said over-hold pool based on skilled-play; and wherein said awarding of a portion of said over-hold pool based on randomness and said awarding of a portion of said over-hold pool based on skilled play contribute to a substantial equivalence between an actual return to player and a theoretical return to player.

In one embodiment, the awarding of a portion of said over-hold pool based on randomness and the awarding of a portion of said over-hold pool based on skilled play is predicated on a pre-established range defined by a trigger over-hold pool amount and threshold over-hold pool amount. In another embodiment, a visual indicator provides players with a running tally of the over-hold pool amount and a likelihood of winning a portion of the over-hold pool.

Besides providing a new casino game concept, the embodiments of the present invention provide a mechanism for casinos to stay within gaming regulations (e.g., GLI-11) requiring gaming machines to pay back at a certain minimum rate.

Other variations, embodiments and features of the present invention will become evident from the following detailed description, drawings and claims.

BRIEF DESCRIPTION OF THE DRAWINGS

FIGS. 11A through 11C illustrate various pay schemes according to embodiments of the present invention.

DETAILED DESCRIPTION

Figure 1:
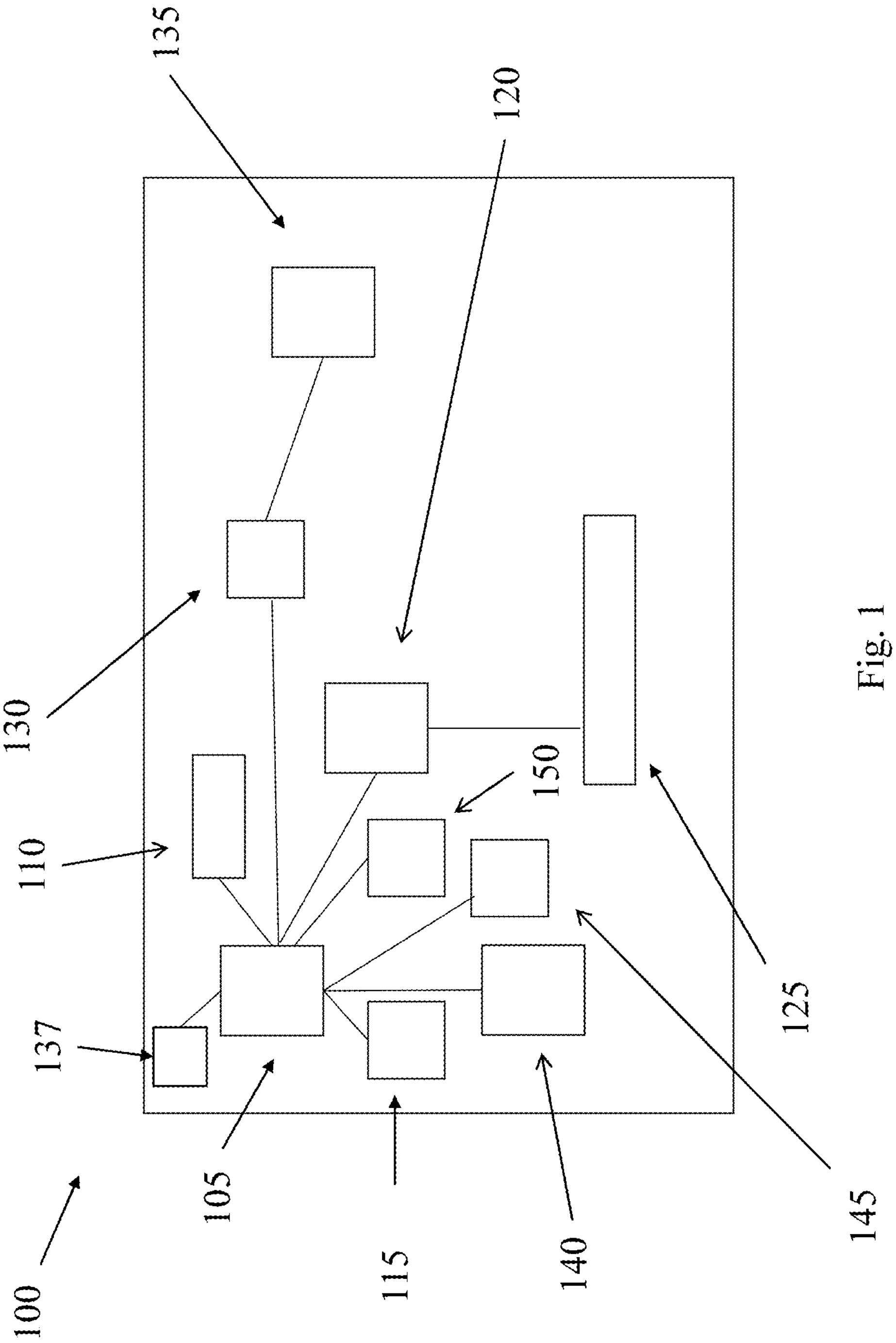
FIG. 1 illustrates a block diagram of components of an electronic gaming machine for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a standalone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

In broadest terms, the embodiments of the present invention are directed at managing over-hold to ensure that actual RTP converges with theoretical RTP as well as ensuring the minimum percentage requirements for GLI-11 are achieved along with the Confidence Interval required by various jurisdictions (e.g., Nevada). GLI-11 are the recognized standards for gaming devices in casinos.

The embodiments of the present invention may be facilitated by an electronic gaming machine controlled by the electronic gaming machine's processor as described herein. The processor may be local or remote (i.e., server-based system). The electronic gaming machine may be a standalone device or bar-top device and forming part of a gaming machine network or not. A block diagram of an exemplary electronic gaming machine 100 is shown in FIG. 1. The exemplary electronic gaming machine 100 may include a central processing unit (CPU) also deemed a processor 105 which controls the electronic gaming machine 100 based on instructions stored in program read-only memory (ROM) 110 and pay table ROM 115. Program ROM 110 stores executable instructions related to the operation of the skill-based gaming machine 100 and which are generally permanent. CPU 105 may be connected to a video controller 120 which provides output to one or more video displays 125. Similarly, an audio controller 130 provides audio output as dictated by the CPU 105 through speakers 135. The aforementioned components, and others, may be attached to a circuit board forming a motherboard. In another embodiment, the electronic gaming machine 100 may be linked to a central game server which allows players to select from a number of games via the electronic gaming machine 100. In such an embodiment, one or more processors integrated into the central server control the gaming machine 100 based on instructions stored in program ROM 110. A random number generator 137 communicates with said processor 105.

A user interface 140 may comprise a button panel or display incorporating touch screen technology or any other devices (e.g., joy stick) providing means for users to communicate with, and instruct, the electronic gaming machine 100. Wager memory 145 stores an amount of money/credits deposited into the electronic gaming machine 100 by a player and specific wager information related to each play of the electronic gaming machine 100. Payout system 150 includes a coupon printer, bill validator and/or similar devices for receiving and distributing currency, tickets and/or coupons via the electronic gaming machine 100.

Those skilled in the art will recognize that the configuration and features of the electronic gaming machine 100 disclosed herein are exemplary and may be altered in any number of ways without impacting the embodiments of the present invention.

Figure 2:
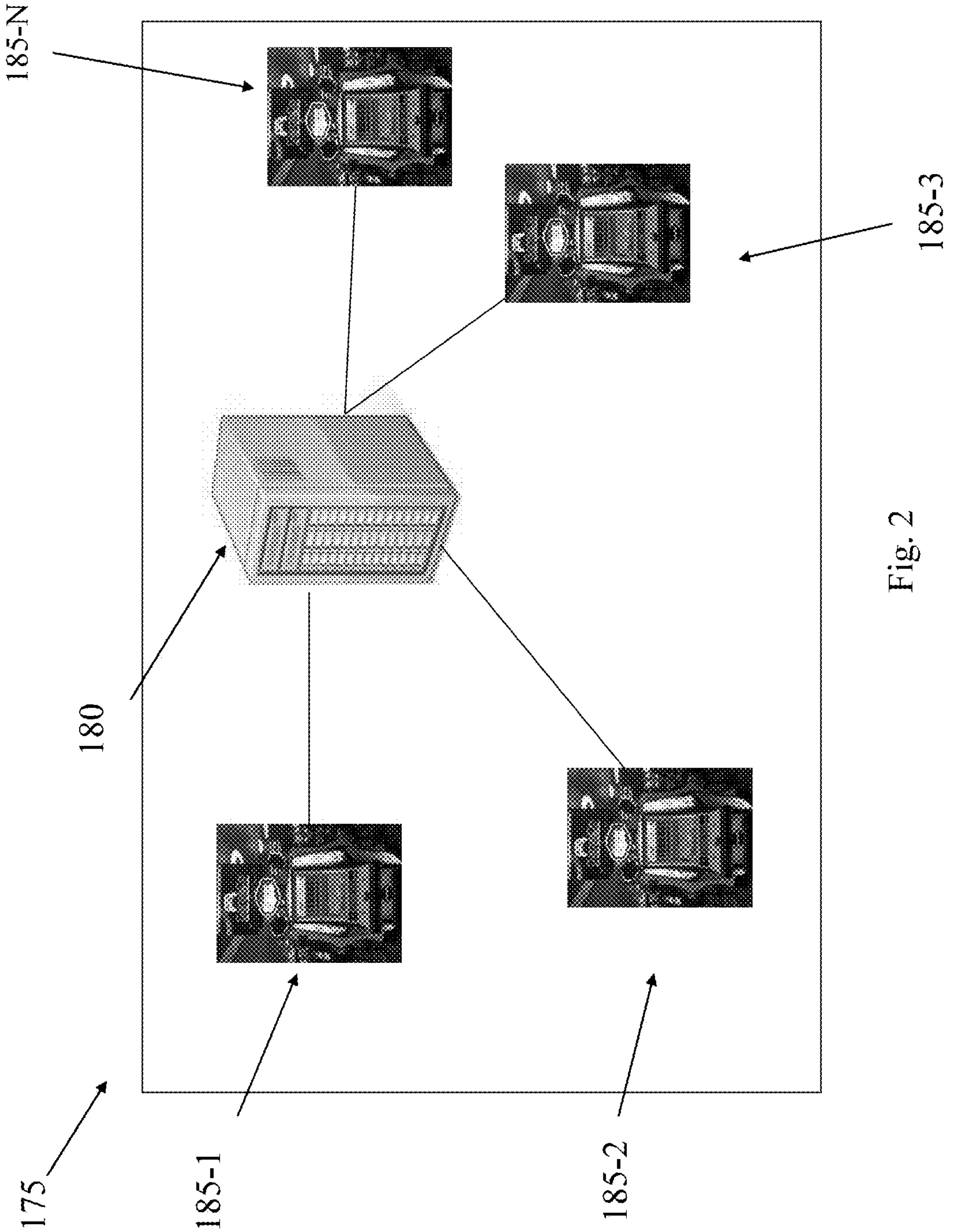
FIG. 2 illustrates a block diagram of a wireless network system accessible by mobile devices for conducting a game according to the embodiments of the present invention.

FIG. 2 shows a block diagram of a gaming network 175 which may be used to facilitate play of a casino-style game of chance via linked gaming machines according to the embodiments of the present invention. The gaming machine network 175 comprises a central processor 180 (e.g., processor-equipped game server) in communication with multiple gaming machines 185-1 through 185-N as described in FIG. 1. The gaming machines 185-1 through 185-N may be smart or dumb clients.

Figure 3:
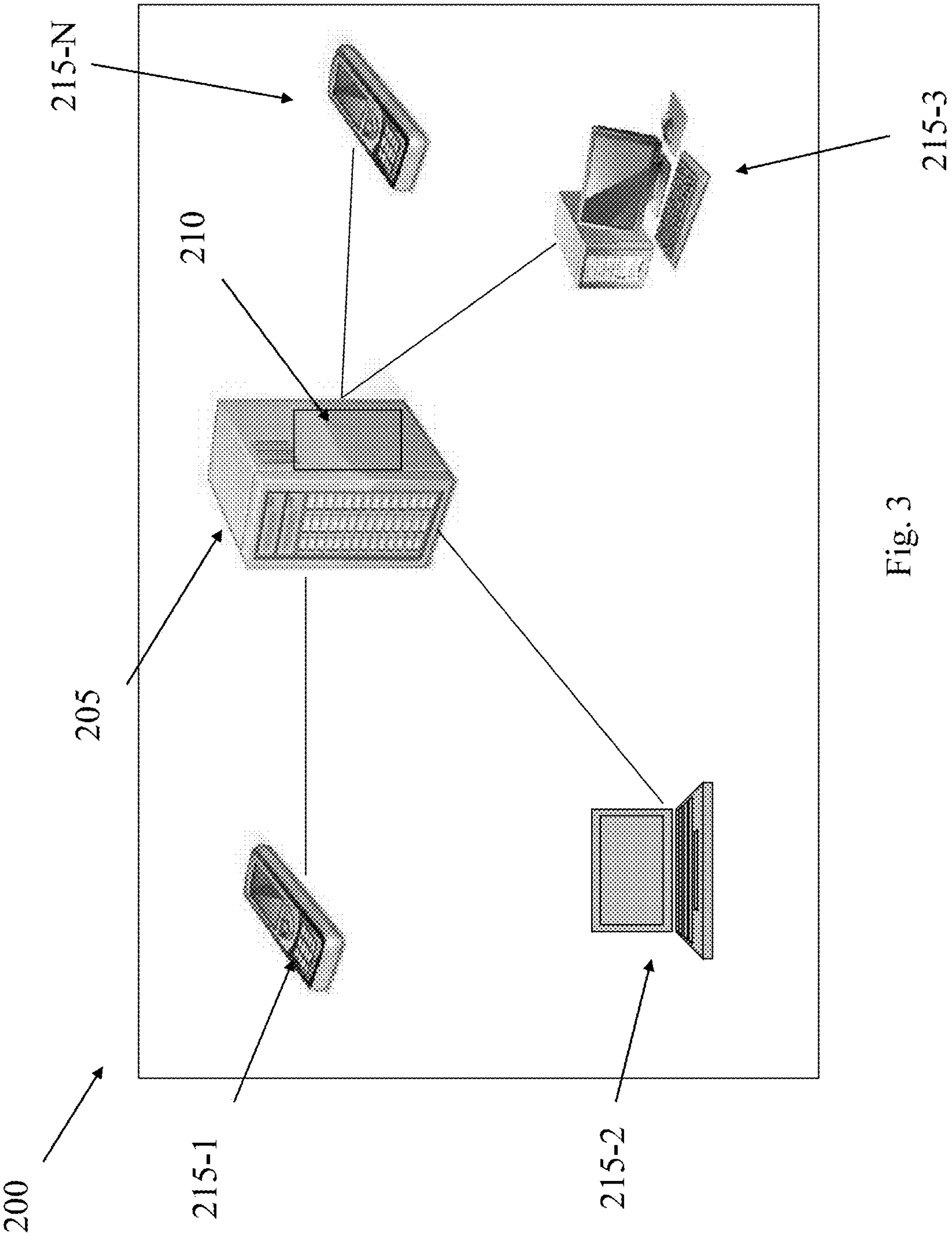
FIG. 3 illustrates a block diagram of a wireless network system accessible by mobile devices for conducting a game according to the embodiments of the present invention.

FIG. 3 shows a block diagram of a wireless gaming system 200 which may be used to facilitate remote play of a casino-style game according to the embodiments of the present invention. The wireless gaming system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video-based game according to the embodiments of the present invention may be in the form of a software application ("App") downloadable onto smart phones, tablets or computers and playable via processing power and a user interface associated therewith.

While the following description may relate to a specific skill-based casino game, the following system and method as described are adaptable to any skill-based casino-style video game.

Figure 4:
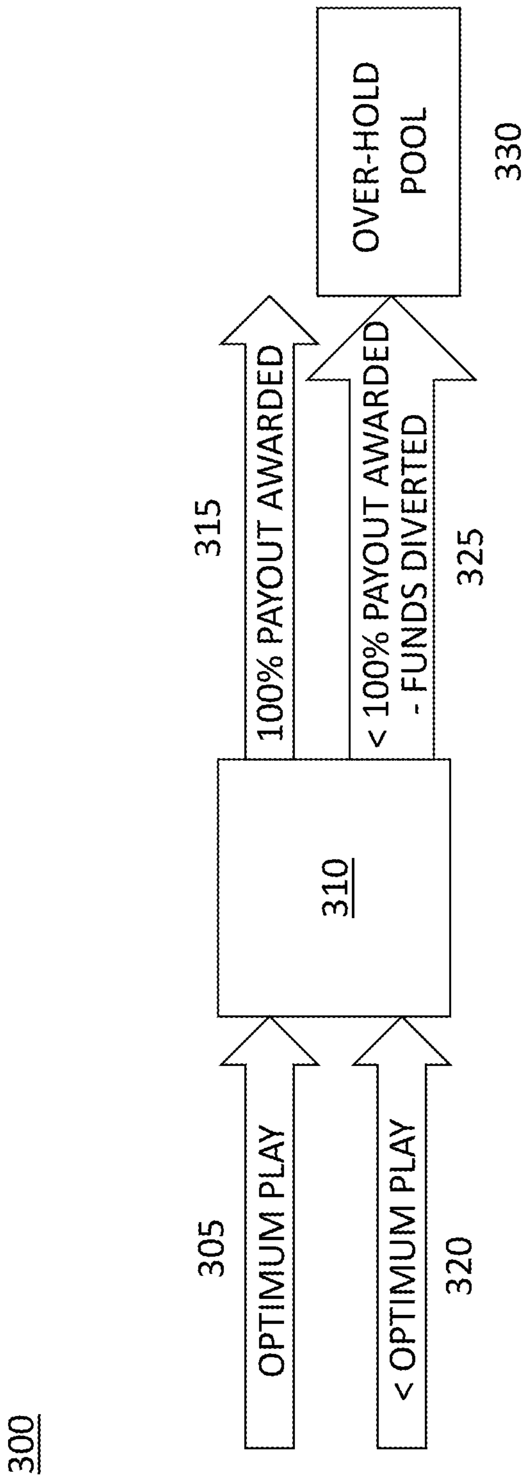
FIG. 4 illustrates a block diagram of funding an over-hold pool according to the embodiments of the present invention.

FIG. 4 shows a block diagram 300 of funding an over-hold pool according to the embodiments of the present invention. Arrow 305 represents an optimal play input into a gaming machine processor 310. Responsive to the optimal play input 305, the processor 310 causes a full payout 315 to be made to the player. Arrow 320 represents a less-than optimal play input. Responsive to the less-than optimal play input 320, the processor 310 may cause a less than full payout 325 to be made (or no payout) to the player and at least a portion of the over-hold related to the less-than optimal play input 320 to be diverted 325 to the over-hold pool 330.

Figure 5:
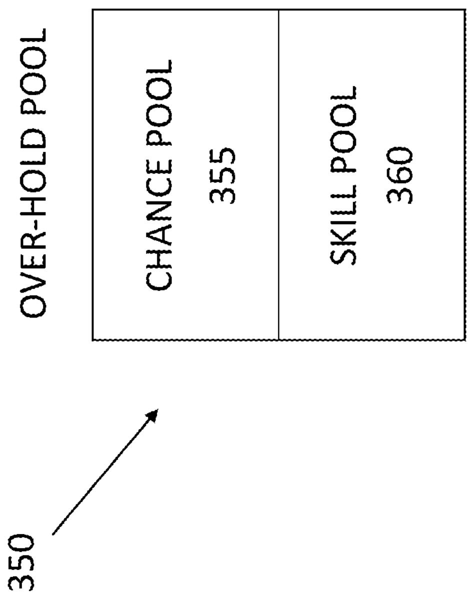
FIG. 5 illustrates an over-hold pool segregated into different sub-pools according to the embodiments of the present invention.

Over-hold as used herein means the amount of money (i.e., funds) the game holds due to a player playing the skill-based game less than optimally. For example, in a shooting game, optimal play means destroying every target whereas in a racing game optimal play is avoiding every obstacle. Under GLI-11, the math model for a gaming device must assume that players perform optimally. However, in reality approximately 25% to 40% of players do not perform optimally resulting in an over-hold relative to the RTP. The monies not won due to less-than optimal play are used to fund the over-hold pool. As shown in FIG. 5, the over-hold pool 350 may be segregated into two sub-pools comprising a chance pool 355 and a skill pool 360. In one embodiment, the chance pool 355 and skill pool 360 each include approximately 50% of the over-hold pool 350. Those skilled in the art will recognize that the percentages held in the chance pool 355 and skill pool 360 may vary (e.g., the chance pool 355 may hold 70% of the over-hold pool while the skill-pool 360 holds 30% of the over-hold pool or vice versa).

Figure 6A:
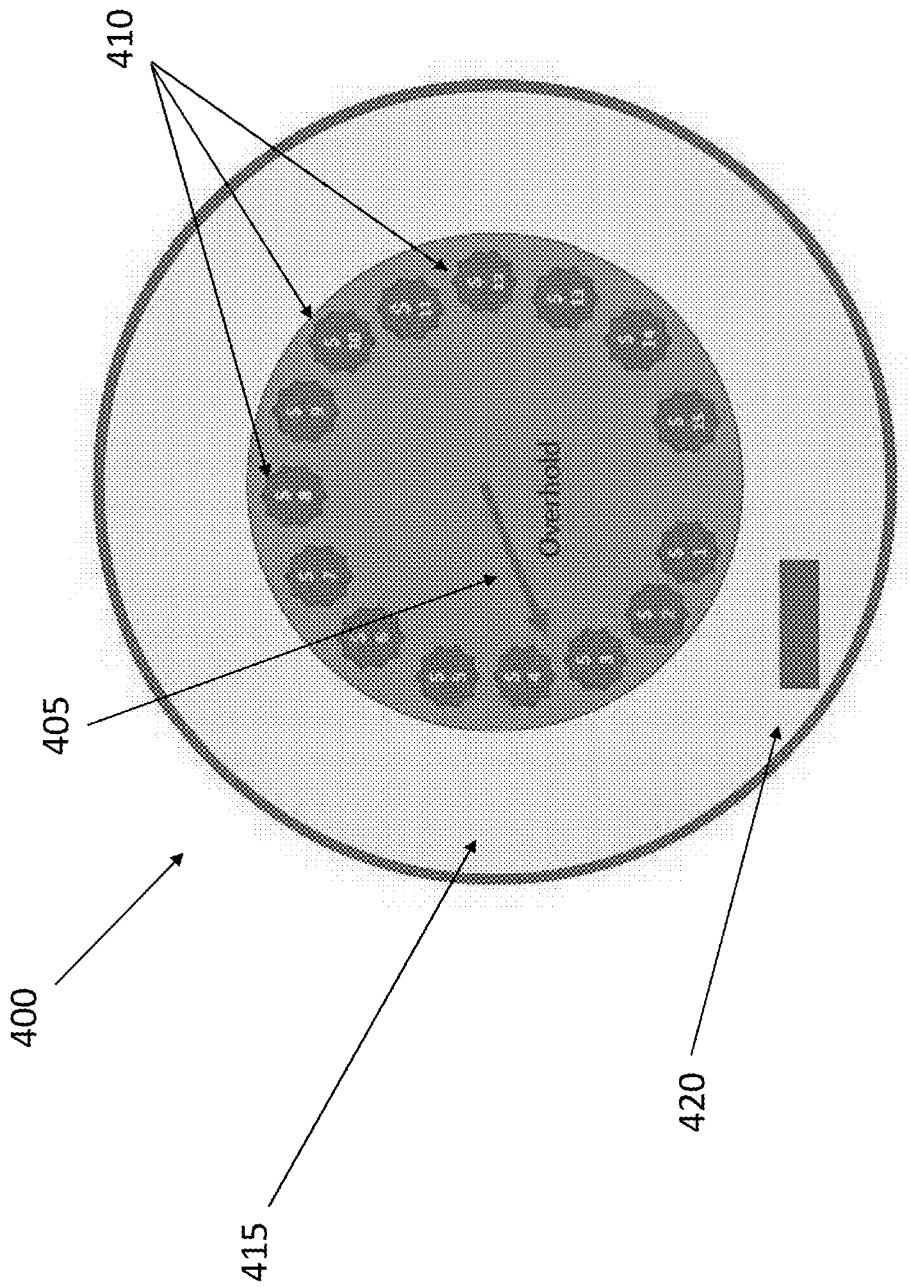
FIGS. 6A and 6B illustrate exemplary over-hold pool visual indicators according to the embodiments of the present invention.
Figure 6B:
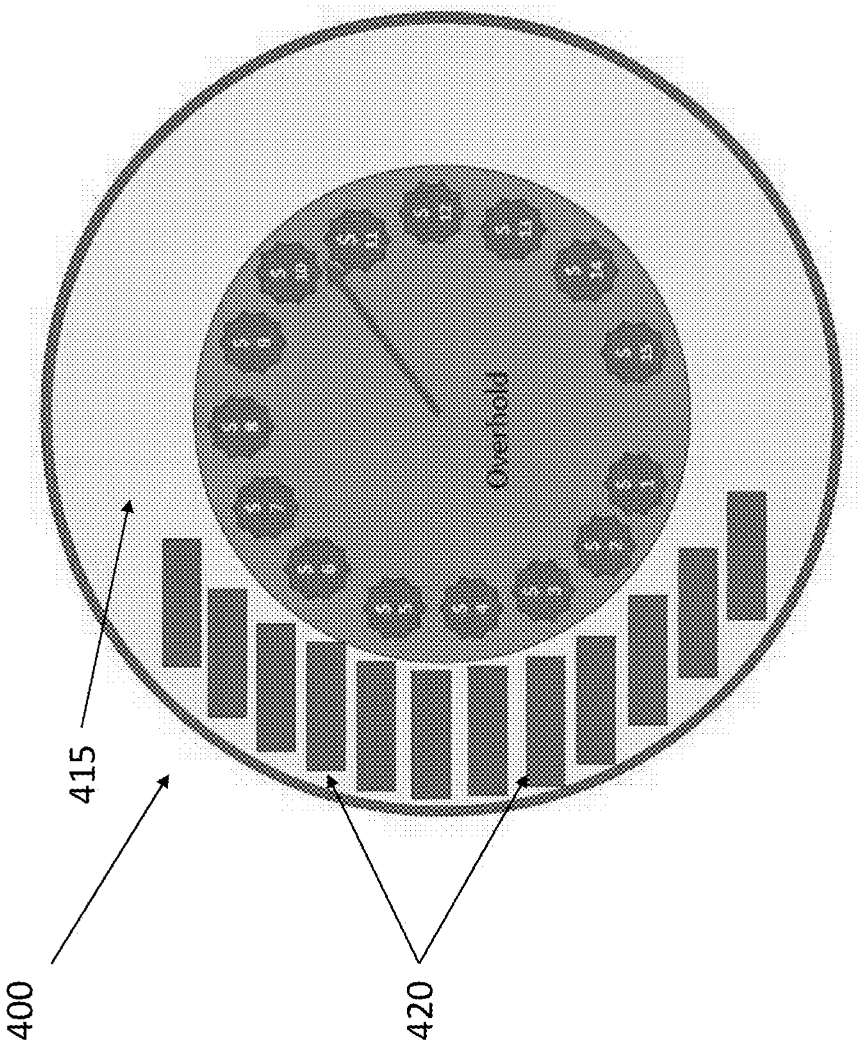

In one embodiment, the over-hold pool amount and likelihood of some portion of the over-hold pool being won are displayed for players. In one such embodiment, as shown in FIGS. 6A and 6B, a wheel 400 is the mechanism which serves to provide the players with the over-hold pool amount and likelihood of some portion of the over-hold pool being distributed. Other mechanisms (e.g., graphs, windows, etc.) may also be used to display the over-hold pool amount and likelihood of some portion of the over-hold pool being won.

Wheel 400 acts to display two pieces of data. The first piece of data is the amount of the over-hold pool represented by arrow 405 and inner icons 410. As shown, as the arrow 405 moves in a clockwise fashion, the over-hold pool amount represented by the inner icons 410 increases as identified by the arrow 405. A bar scale 415, utilizing a series of bars 420 that progress clockwise about the inner icons 410, represents the likelihood of a portion of the over-hold pool being distributed (i.e., the threshold amount being reached).

Figure 7:
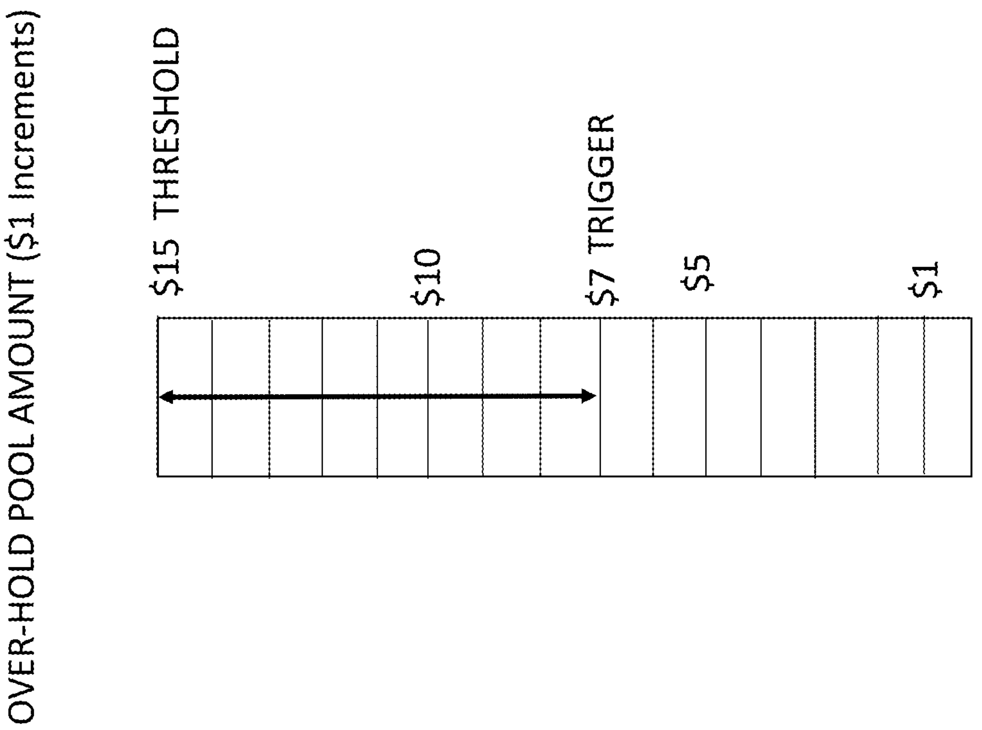
FIG. 7 illustrates a diagram of an over-hold pool payout scheme according to the embodiments of the present invention.

In one embodiment, a portion of the over-hold pool 350 for each the chance pool 355 and skill pool 360 is eligible to be won once a trigger amount 455 is reached and must be won by the time a threshold amount 460 is reached. FIG. 7 shows an exemplary diagram 450 identifying the trigger amount as $7 and the threshold amount of $15. FIGS. 6A and 6B shows a trigger amount of $3 (one bar has been displayed in FIG. 6A) and a threshold amount of $15. As the arrow progresses towards the threshold amount of $15, more bars 420 are added to signify a pending award.

In one embodiment, once the value of the chance pool 355 reaches the trigger amount, each subsequent wager may result in awarding at least a portion of the chance pool 355. In one embodiment, the probability of winning the chance pool 355 increases linearly from a 10% probability associated with the trigger amount to 100% at the threshold amount. In one embodiment, the chance pool payout is between 50% and 100% of the chance pool amount as determined by the RNG.

In one embodiment, once the value of the skill pool 360 reaches the trigger amount, each subsequent eliminated goal or conquered objective may result in awarding at least a portion of the skill pool 360. In one embodiment, like the chance pool methodology, the probability of winning the skill pool 360 increases linearly from a 10% probability associated with the trigger amount to 100% at the threshold amount and the skill pool payout is between 50% and 100% of the skill pool amount as determined by the RNG. In one embodiment, when the skill pool reaches its threshold, the next successful skill-based objective to be achieved by a player results in a win of at least a portion of the skill pool. Alternatively, the skill pool award may be automatically paid when the skill pool threshold is reached.

In another embodiment, the chance pool 355 and skill pool 360 are never zeroed out. In such an embodiment, the chance pool 355 and skill pool 360 always have a positive amount to maintain the interest of players and encourage longer play. Regardless of the embodiment, the chance pool payouts and skill pool payouts are used to ensure a degree of equivalence or convergence between the actual RTP and theoretical RTP. In terms of a formula: Game RTP=(Optimal Play Payouts+Less-Than Optimal Play Payouts+Chance Pool Payouts+Skill Pool Payouts)/Total Money Wagered. Accordingly, the casino may manage the game RTP by adjusting the chance pool payouts and skill pool payouts.

The embodiments of the present invention are suitable for single gaming machines or may be implemented across multiple gaming machines such that chance pool 355 and skill pool 360 may grow faster and larger based on multiple gaming machines contributing to a single common over-hold pool.

Figure 8A:
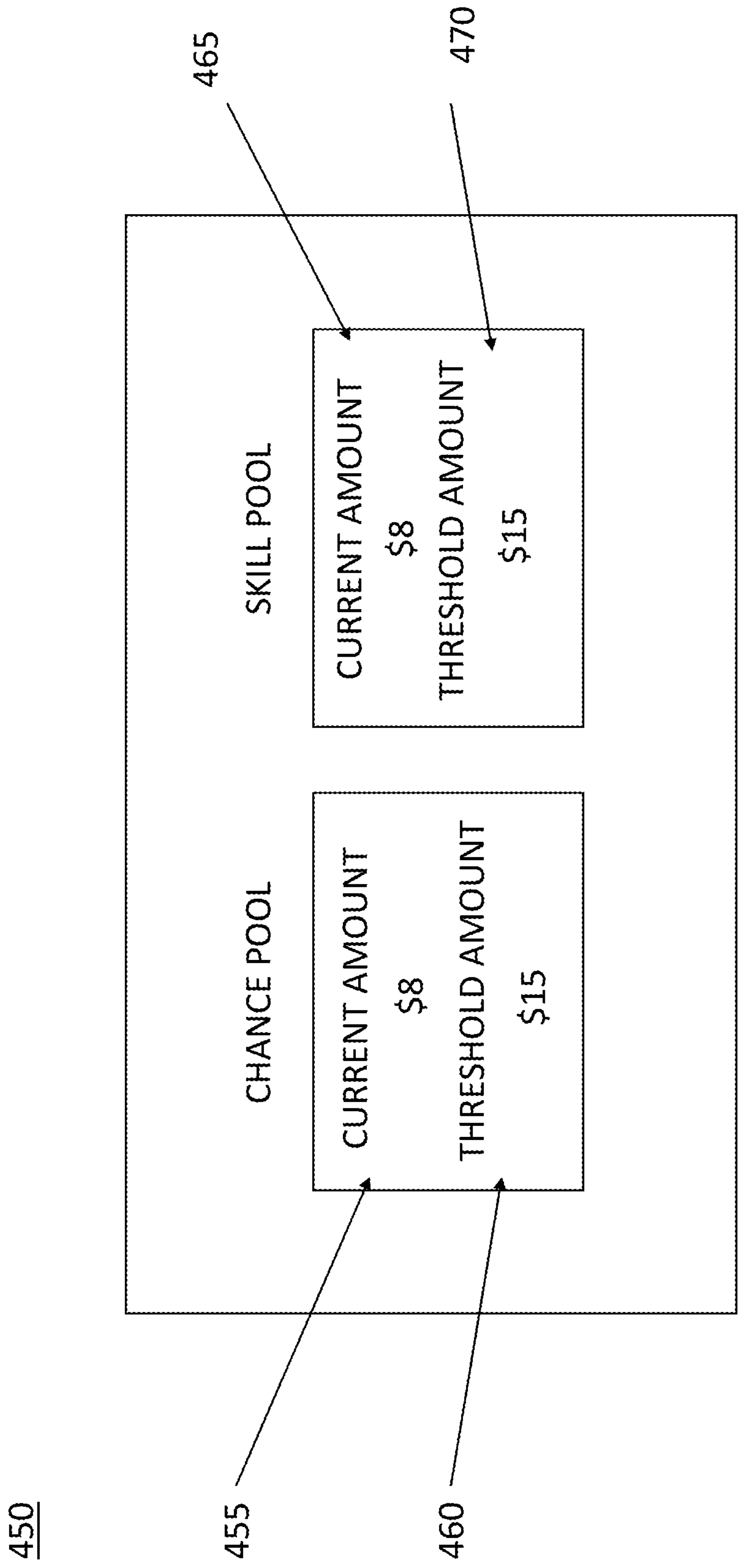
FIGS. 8A through 8C illustrate a display configured to show the chance pool and skill pool amounts according to the embodiments of the present invention.
Figure 8B:
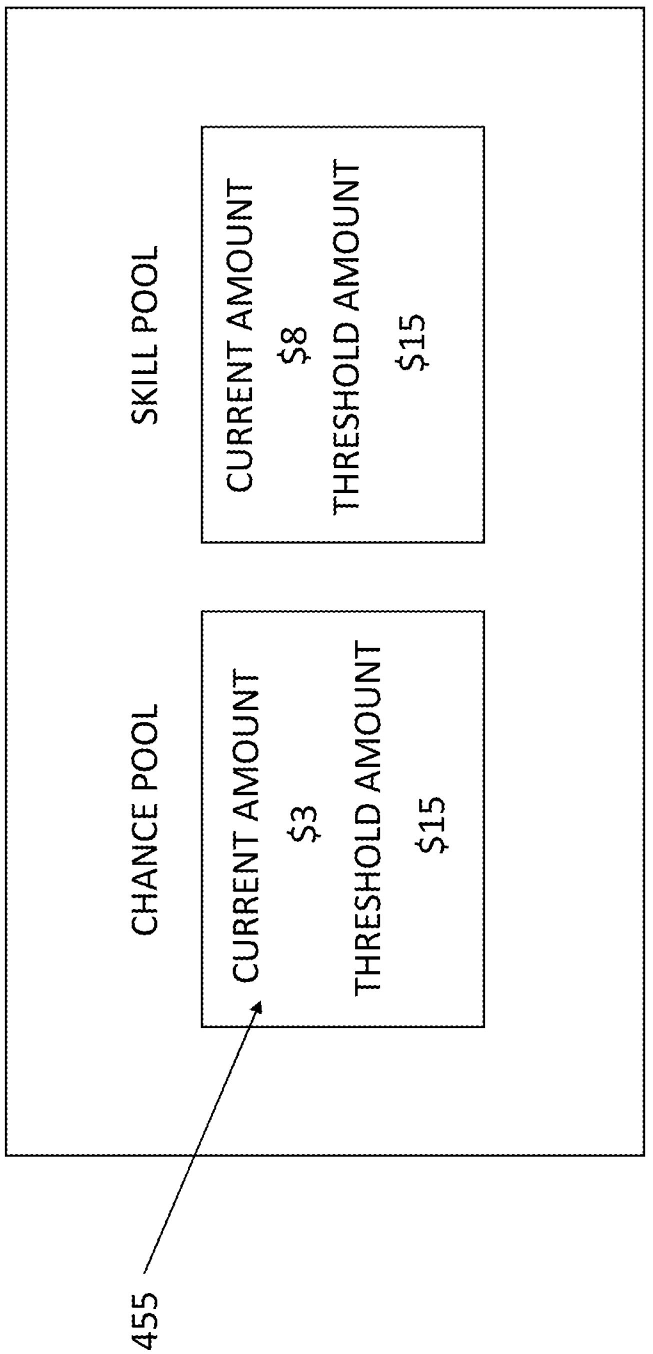
Figure 8C:
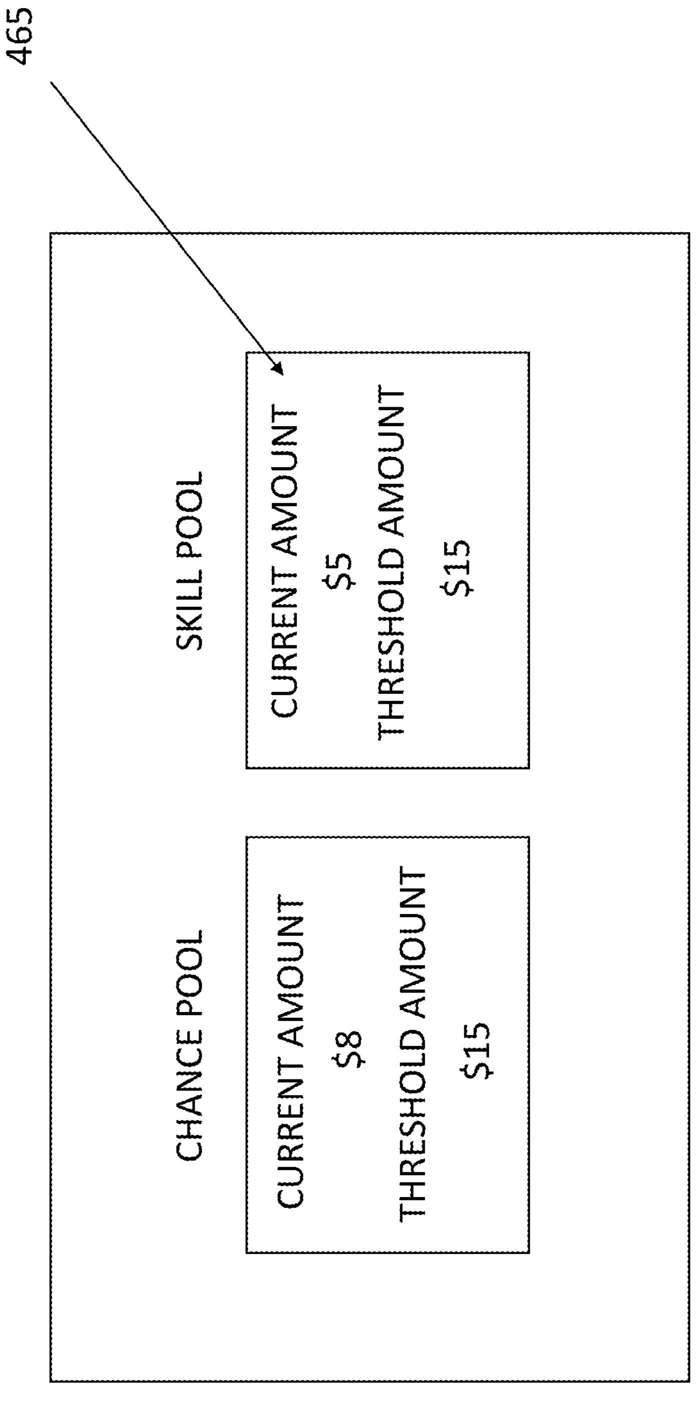

FIGS. 8A through 8C show a chance pool and skill pool display 450 depicting a current chance pool amount 455, chance pool threshold amount 460, current skill pool amount 465 and skill pool threshold amount 470. As shown, the current chance pool amount 455 and current skill pool amount 465 are equivalent. In FIG. 8B, the display 450 shows that a portion ($5) of the chance pool has been awarded while FIG. 8C shows that a portion ($3) of skill pool has been awarded such that the amounts are updated.

Figure 9:
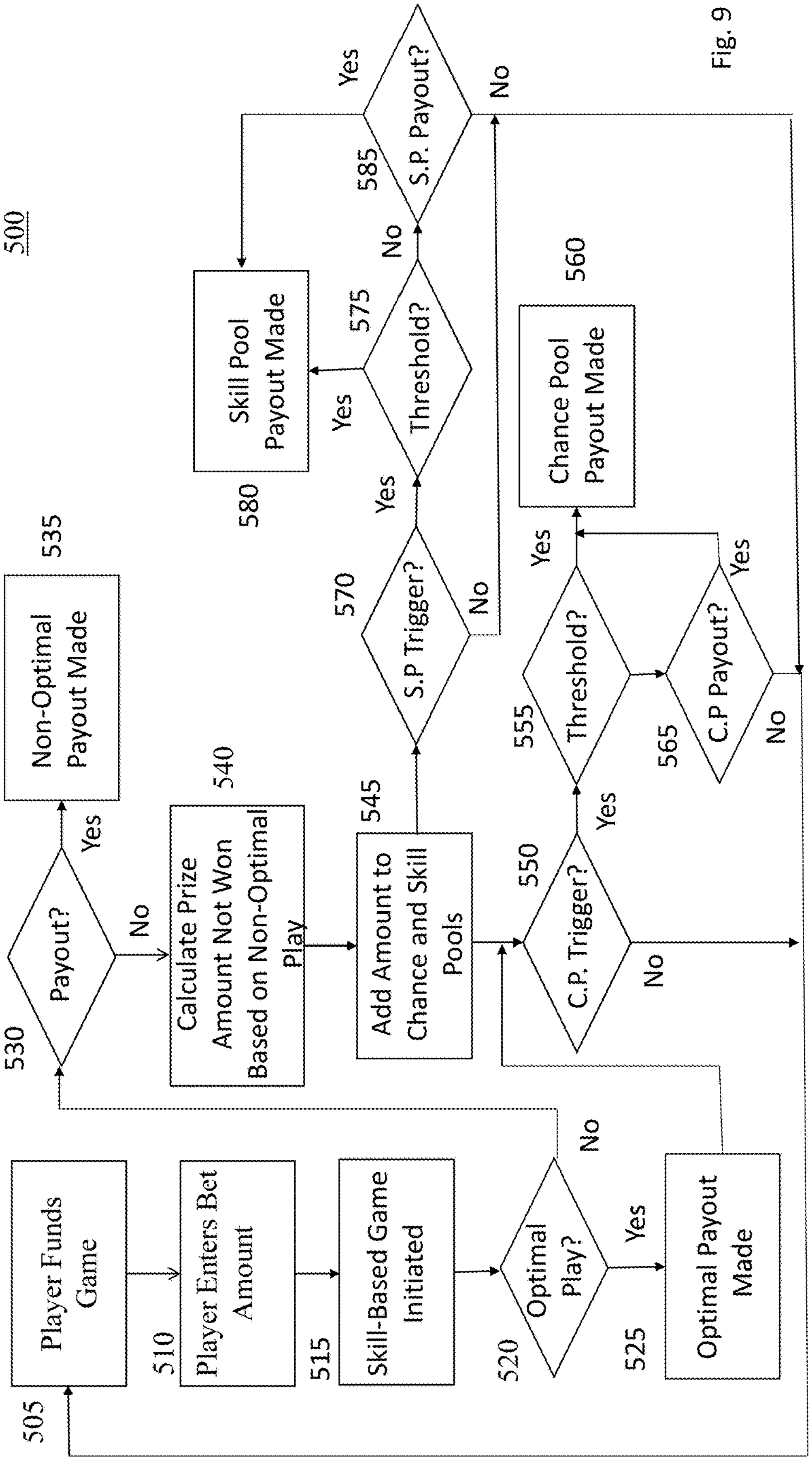
FIG. 9 illustrates a flow chart detailing one methodology for conducting a casino-style skill-based game according to the embodiments of the present invention.

FIG. 9 illustrates a flow chart 500 detailing one methodology for conducting a skill-based casino-style game according to the embodiments of the present invention. At step 505, a player funds the gaming machine by inserting currency, coins, vouchers and/or tickets into a bill validator or ticket reader. The funding amount is then displayed on the gaming machine's credit meter. At step 510, a player enters a bet amount for the game or keeps it constant from the last game play. The bet amount is then displayed on a bet meter. The bet amount range (e.g., $1 to $25) is established by the house or casino offering the game facilitated by the gaming machine. At step 515, a skill-based game is initiated by the player. At step 520, the processor monitors the game play to determine if the player is playing optimally. The processor may do so in real-time during play, after a certain time of play, after the play, based on the bet, has ended or in any other time-based period desired. The significant objective is to determine if the player is playing optimally or not. If so, at step 525, a pre-established payout is made to the player in association with optimal play and the bet placed at step 510. If, at step 520, it is determined that the player is, or was not, playing optimally, at step 530, it is determined if the play is worthy of a less-than optimal play payout. If so, at step 535, a pre-established payout is made to the player in association with less-than optimal play and the bet placed at step 510. If, at step 530, it is determined that the less-than optimal play is not worthy of a payout, at step 540, the processor determines the amount not won due to less-than optimal play. For example, if the player could have won $5 with optimal play but only won $3 based on less-than optimal play, $2 is added to the over-hold pool (i.e., $5−$3=$2). At step 545, the money added to the over-hold pool at step 540 is shared in a pre-established manner between the chance pool and skill pool. At step 550, it is determined if the trigger amount has been reached for the chance pool. If so, at step 555, it is determined if the chance pool threshold amount has been reached. If so, at step 560, a chance pool payout is made. If, at step 555, the chance pool threshold has not been reached, at step 565, it is determined if a random chance pool payout is to be made. If so, at step 560, a chance pool payout is made. If, at step 555, it is determined that no chance pool payout is to be made, the flowchart 500 loops back to step 505 (or step 510 if the gaming machine is already funded).

At step 570, it is determined if the trigger amount has been reached for the skill pool. If so, at step 575, it is determined if the skill pool threshold has been reached. If so, at step 580, a portion of the skill pool is paid out. If, at step 570, the skill pool trigger amount has not been reached, the flow chart loops back to step 505 (or step 510 if the gaming machine is already funded). If, at step 575, the skill pool threshold has not been reached, it is determined if a skill pool payout is to be made. If so, a skill pool payout is made at step 580. Play continues in this manner with the over-hold pool being funded with amounts not won due to less-than optimal play. Those skilled in the art will recognize that the steps of the flowchart 500 are for reference purposes and may be handled in different orders than shown and may be handled simultaneously rather than in chronological order.

Figure 10A:
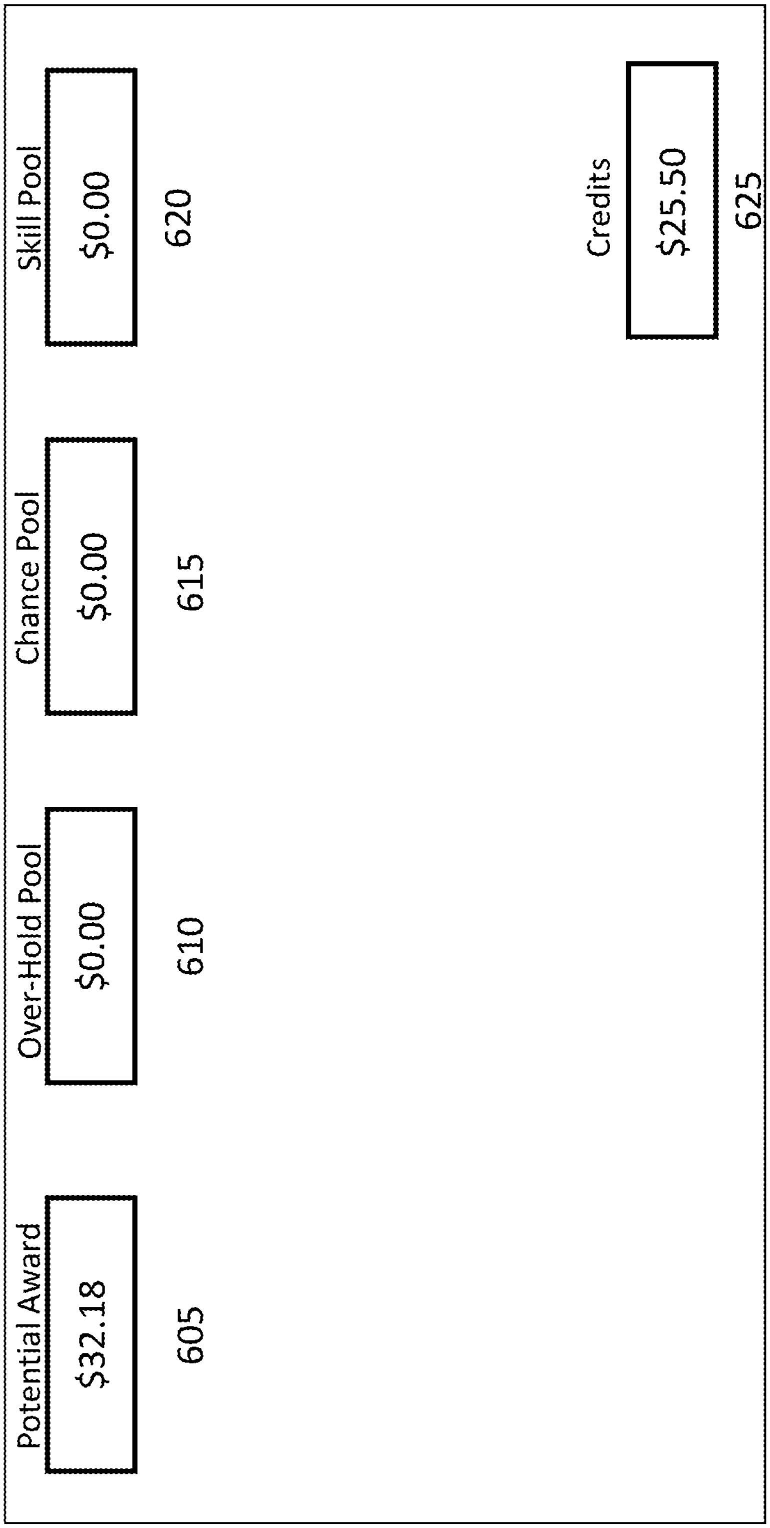
FIGS. 10A through 10F illustrate screen shots detailing various meters associated with the embodiments of the present invention.
Figure 10B:
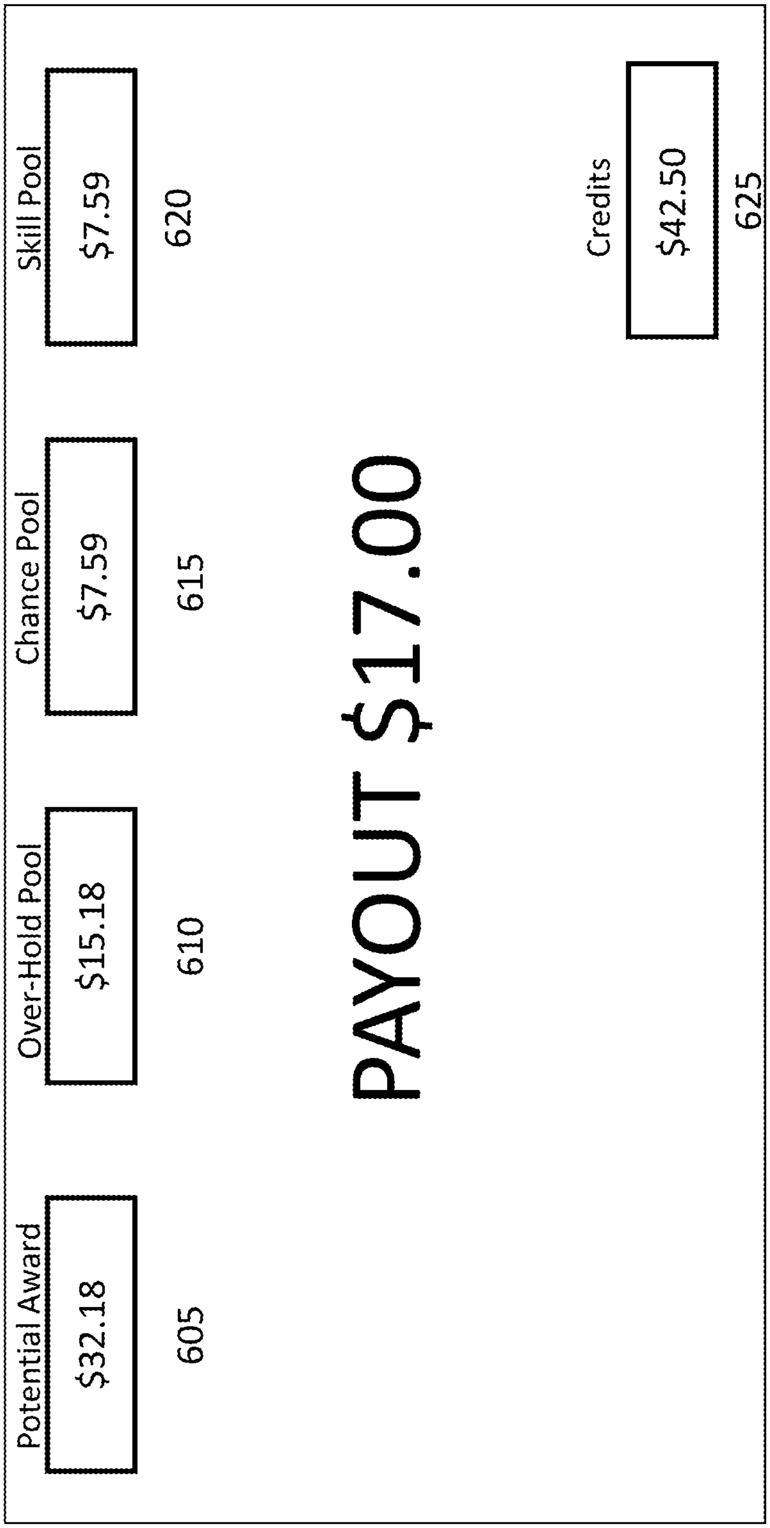

FIGS. 10A through 10F show screen shots of meters used to track pool meters according to the embodiments of the present invention. In one embodiment, a potential payout is randomly determined. Normally, the potential payout is not shown to the player but is shown in FIGS. 10A through 10G for purposes of reference. FIG. 10A shows a screen shot including a potential payout meter 605, over-hold meter 610, chance pool meter 615, skill pool meter 620 and credit meter 625. As shown, the potential payout meter 605 reflects $32.18 and the credit meter 625 depicts $25.50. The potential payout meter 605 is indicative of the payout a player wins for executing a perfect skill-based challenge. In this instance, the player did not execute a perfect skill-based challenge as shown in FIG. 6B. The payout to the player is shown as $17.00, which is added to the credit meter 625, with the balance of $15.18 (i.e., $32.18−$17.00) being added to the over-hold meter 610. Each of the chance pool meter 615 and skill pool meter 620 reflect an equal amount ($7.59) of the over-hold meter 605.

Figure 10C:
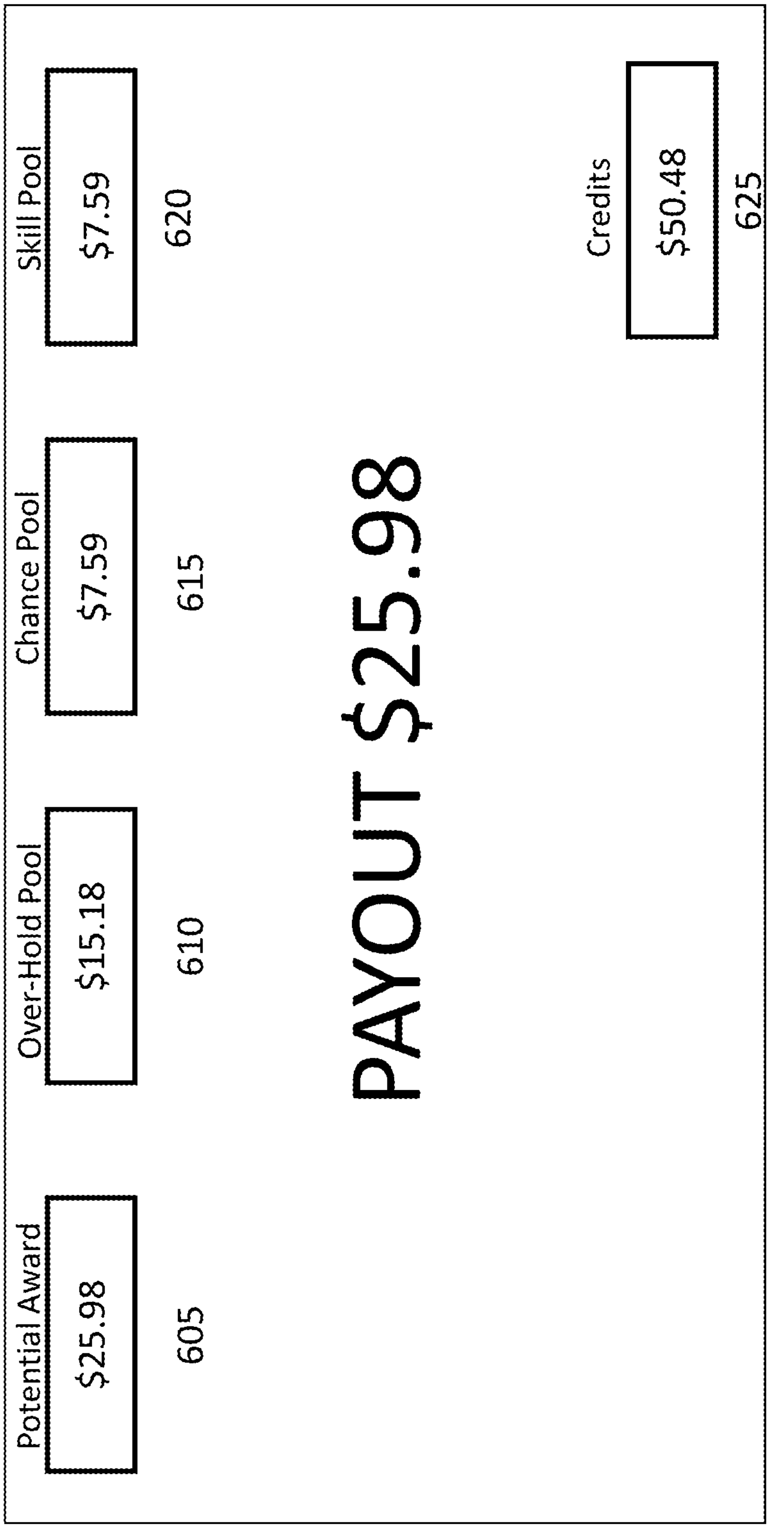
Figure 10D:
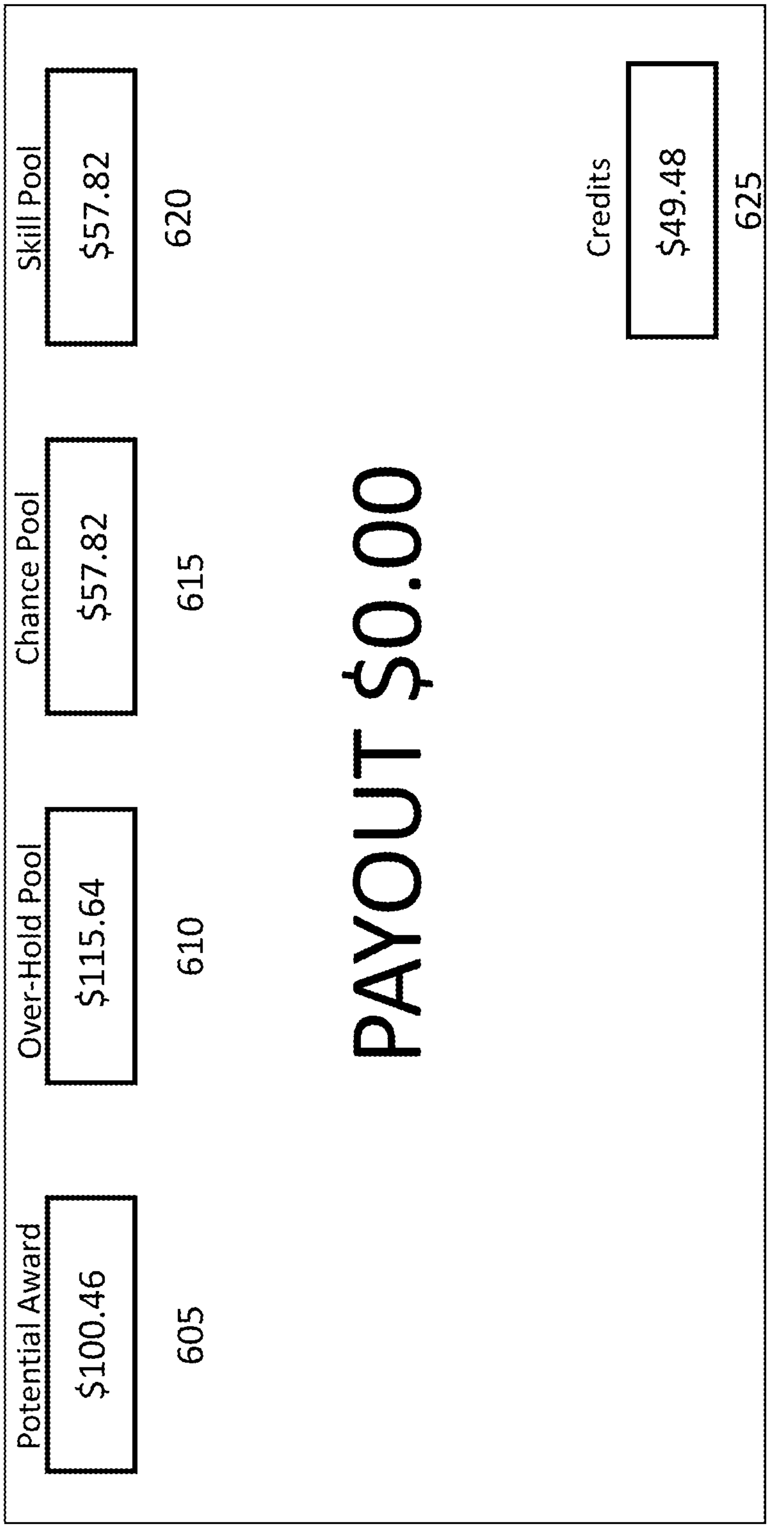
Figure 10E:
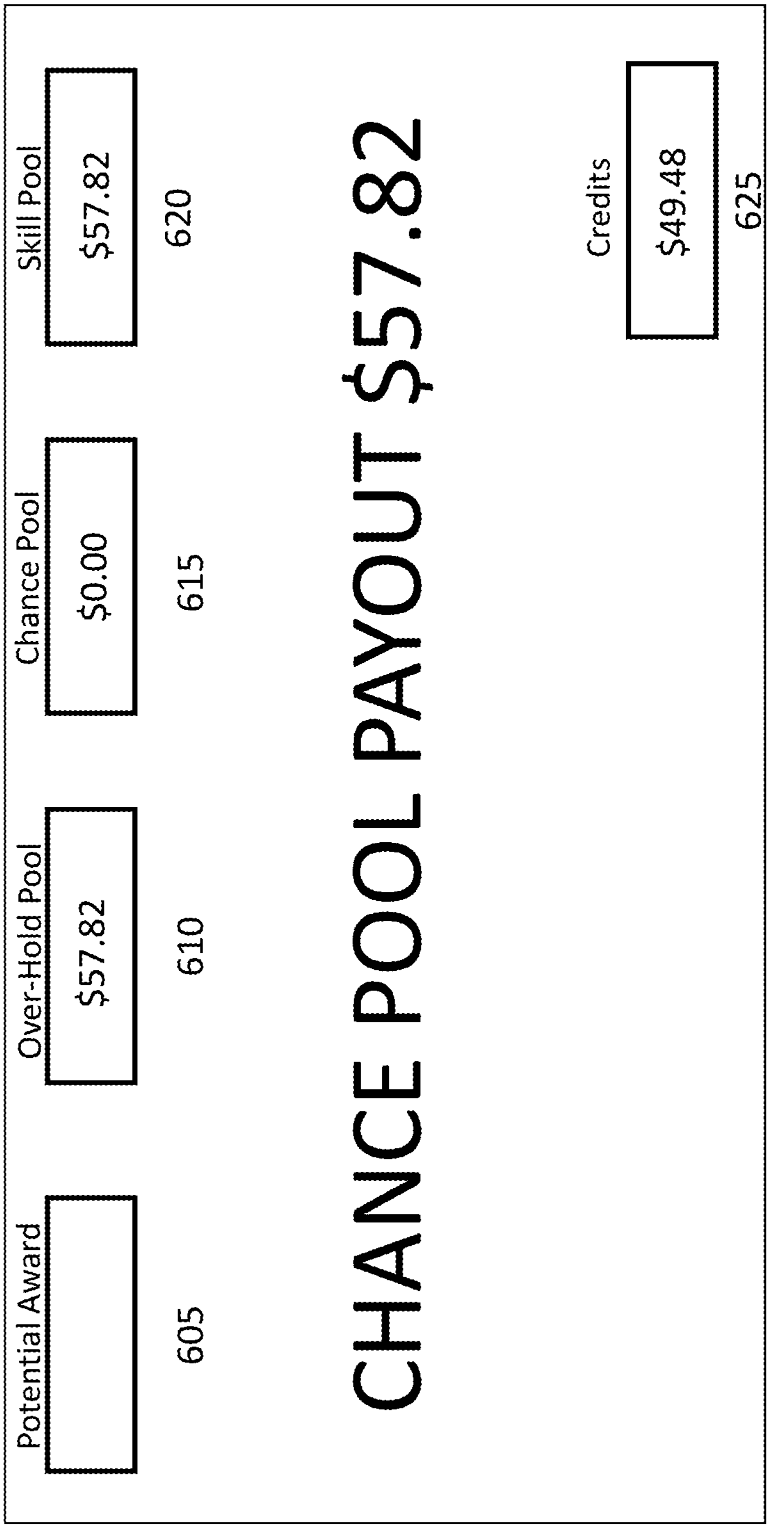
Figure 10F:
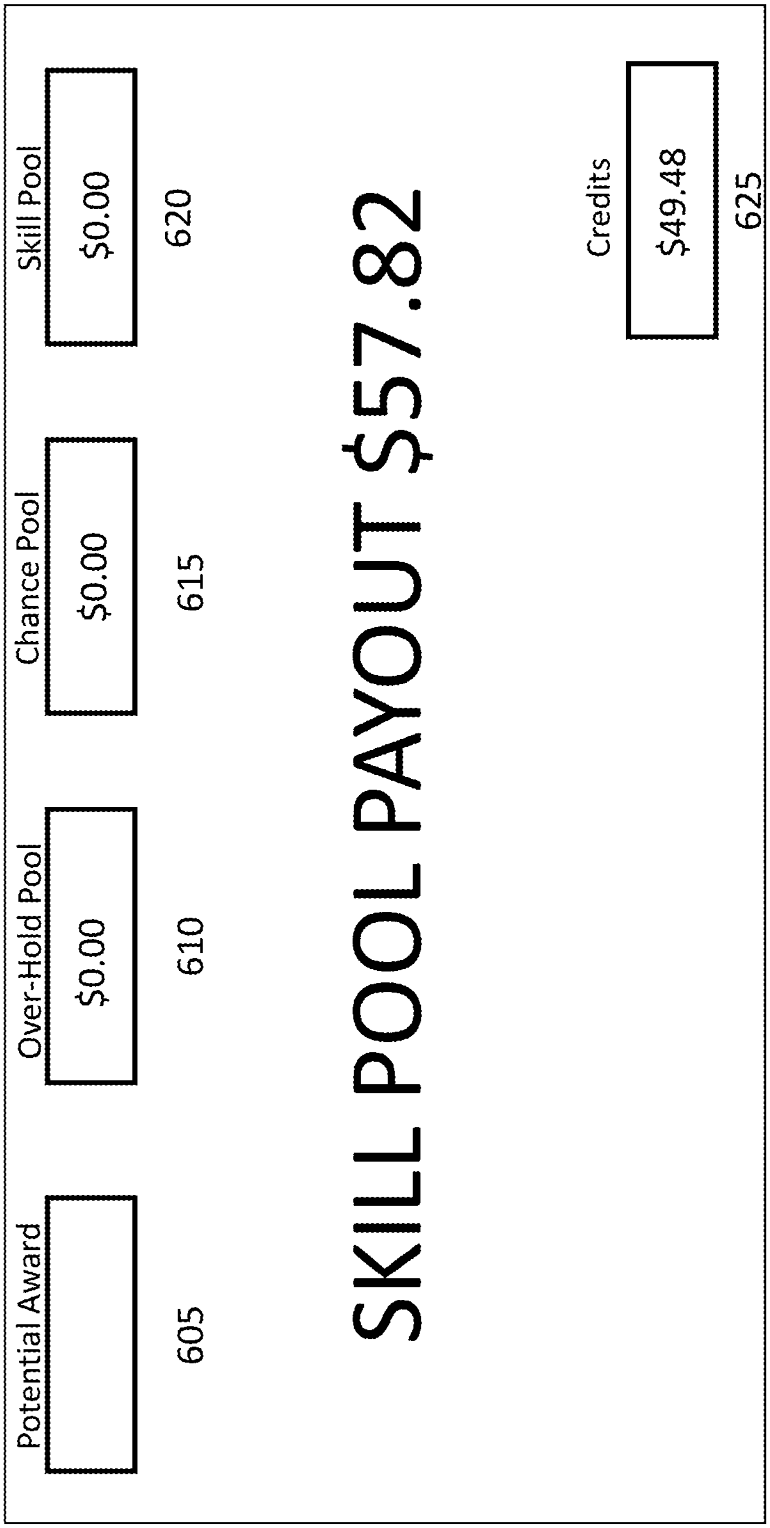

FIG. 10C shows that on the next play the potential payout is set at $25.98. In this instance, the player did execute a perfect skill-based challenge winning the $25.98 which is added to the credit meter 625 (minus $1.00 for the play). FIG. 10D shows that on the next play the potential payout is set to $100.46. In this instance, the player did not achieve any payout. Thus, the over-hold meter 610 has been increased by the $100.46 with the chance pool meter 615 and skill pool meter 620 receiving 50% of the $100.46. FIG. 10E shows the player winning the chance pool of $57.82. The chance pool is randomly awarded at any time. In one embodiment, as set forth above, the chance pool is won between a trigger amount and an upper threshold amount. FIG. 10F shows the skill pool being won. The skill pool is only available to be won if the player successfully accomplishes a skill-based challenge.

FIGS. 11A through 11C show various pay schemes according to embodiments of the present invention. FIG. 11A shows a first exemplary pay table 700-1 listing a range of over-hold pool threshold values 705 and corresponding over-hold pool payout percentages 710. With pay table 700-1, when a bet results in a payout (base pay) and the over-hold pool amount is above the minimum threshold value (as shown $10.00), the player wins the percentage of the over-hold pool amount shown in column 710. For example, if a player wins a base pay amount of $5.00 with the threshold value at $25.00, the player wins an additional 10% of the threshold value of $25.00 or $2.50. Accordingly, the total player payout is $7.50 (i.e., $5.00+$2.50).

FIGS. 11B and 11C show three exemplary pay tables 700-2 through 700-4 based on a $1 bet and multipliers 715-1 through 715-3, weighted percentage 720-1 through 720-3 and RTP percentage 725-1 through 725-3. Pay table 700-2 is used when the over-hold threshold value is less than $10.00; pay table 700-3 is used when the over-hold threshold value is equal to or more than $10.00 and pay table 700-4 is used when the over-hold threshold value is more than $20.00 with the total RTP percentage set at 90%, 95% and 100%, respectively. By way of example, if a base pay amount is $10.00 and the over-hold pool amount is at $15.00, pay table 700-3 is used. Consequently, based on weighted percentages, a multiplier amount is randomly selected and used to increase the base pay amount accordingly.

Although the invention has been described in detail with reference to several embodiments, additional variations and modifications exist within the scope and spirit of the invention as described and defined in the following claims.

We claim:

1. A gaming machine comprising:

at least a processor running executable instructions related to running a skill-based casino game;

a display;

a user interface;

memory in communication with said processor; and wherein said processor running said executable instructions: (i) monitors actual skill play against optimal skilled play; (ii) maintains an over-hold pool of funds related to prizes not awarded due to less-than optimal skilled play; (ii) maintains an over-hold pool of funds related to prizes not awarded due to less-than optimal skilled play; (iii) during subsequent plays of the skilled-based casino game, awards a portion of said over-hold pool based on randomness; (iv) during subsequent plays of the skilled-based casino game, awards a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

2. The gaming machine of claim 1 wherein said over-hold pool is formed of a chance pool and skill pool.

3. The gaming machine of claim 2 wherein said chance pool and said skill pool share equally in the over-hold pool of funds related to prizes not awarded due to less-than optimal skilled play.

4. The gaming machine of claim 2 wherein a random number generator determines an award amount from said chance pool and said skill pool.

5. The gaming machine of claim 1 wherein said chance pool and said skill pool each include a trigger amount which must be reached for an award to be made from said chance pool and said skill pool.

6. The gaming machine of claim 1 wherein said chance pool and said skill pool each include a threshold amount at which point an award must be made from said chance pool and said skill pool.

7. The gaming machine of claim 1 wherein said chance pool and said skill pool each include a trigger amount which must be reached for an award to be made from said chance pool and said skill pool; a threshold amount at which point an award must be made from said chance pool and said skill pool; and a linear model under which amounts associated with said chance pool and said skill pool increment.

8. A gaming machine comprising:

at least a processor running executable instructions related to running a skill-based casino game;

a display;

a user interface;

memory in communication with said processor; and wherein said processor running said executable instructions: (i) creates an over-hold pool formed of a chance pool and skill pool of funds related to prizes not awarded due to less-than optimal skilled play; (ii) after a trigger amount associated with said chance pool is reached, awards a portion of said over-hold pool based on randomness; (iii) after a trigger amount associated with said skill pool is reached, awards a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

9. The gaming machine of claim 8 wherein said chance pool and said skill pool share equally in the over-hold pool of funds related to prizes not awarded due to less-than optimal skilled play.

10. The gaming machine of claim 8 wherein a random number generator determines an award amount from said chance pool and said skill pool.

11. The gaming machine of claim 8 wherein said chance pool and said skill pool each include a threshold amount at which point an award must be made from said chance pool and said skill pool.

12. The gaming machine of claim 8 further comprising a linear model under which award amounts associated with said chance pool and said skill pool increment.

13. A method comprising:

utilizing a processor running executable instructions to run a skilled-based casino game on a gaming machine including a display, user interface, and memory in communication with said at least one processor; and via said processor, (i) monitoring actual skilled play against optimal skilled play; (ii) managing an over-hold pool of funds related to prizes not awarded due to less than optimal skilled play; (iii) during subsequent play plays of the skilled-based casino game, awarding a portion of said over-hold pool based on randomness; (iv) during subsequent play plays of the skilled-based casino game, awarding a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

14. The method of claim 13 further comprising forming said over-hold pool of a chance pool and skill pool.

15. The method of claim 14 further comprising forming said chance pool and said skill pool to share equally in the over-hold pool of funds related to prizes not awarded due to less-than optimal skilled play.

16. The method of claim 13 further comprising utilizing a random number generator to determine an award amount from said chance pool and said skill pool.

17. The method of claim 13 further comprising including a trigger amount with said chance pool and skill pool which must be reached for an award to be made from said chance pool and said skill pool, respectively.

18. The method of claim 13 further comprising including a threshold amount with said chance pool and skill pool at which point an award must be made from said chance pool and said skill pool, respectively.

19. The method of claim 17 further comprising a linear model under which amounts associated with said chance pool and said skill pool increment.

20. The method of claim 18 further comprising a linear model under which amounts associated with said chance pool and said skill pool increment.

21. A method comprising:

utilizing at least a processor running executable instructions related to running a skill-based casino game, a display, a user interface, memory in communication with said processor; and via said processor: (i) creating an over-hold pool formed of a chance pool and skill pool of funds related to prizes not awarded due to less-than optimal skilled play; (ii) after a trigger amount associated with said chance pool is reached, awarding a portion of said over-hold pool based on randomness; (iii) after a trigger amount associated with said skill pool is reached, awarding a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

22. The method of claim 21 further comprising forming said chance pool and said skill pool to share equally in the over-hold pool of funds related to prizes not awarded due to less-than optimal skilled play.

23. The method of claim 21 further comprising utilizing a random number generator to determine an award amount from said chance pool and said skill pool.

24. The method of claim 21 further comprising including a trigger amount with said chance pool and skill pool which must be reached for an award to be made from said chance pool and said skill pool, respectively.

25. The method of claim 21 further comprising including a threshold amount with said chance pool and skill pool at which point an award must be made from said chance pool and said skill pool, respectively.

26. The method of claim 21 further comprising a linear model under which amounts associated with said chance pool and said skill pool increment.

27. A gaming machine comprising:

at least a processor running executable instructions related to running a skill-based casino game;

a display;

a user interface;

memory in communication with said processor; and wherein said processor running said executable instructions: (i) causes the generation of a random potential award based on optimal skilled play; (ii) monitors actual skilled play against optimal skilled play; (iii) maintains an over-hold pool of funds related to a portion of said random potential pool not awarded due to less-than optimal skilled play; (iv) during subsequent play of the skilled-based casino game, awards a portion of said over-hold pool based on randomness; (v) during subsequent play of the skilled-based casino game, awards a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

28. A method comprising:

utilizing a processor running executable instructions to run a skill-based casino game on a gaming machine including a display, user interface, and memory in communication with said at least one processor; and via said processor, (i) generating a random potential award based on optimal skilled play;

(ii) monitoring actual skilled play against optimal skilled play; (iii) managing an over-hold pool of funds related to a portion of said potential award not awarded due to less than optimal skilled play; (iv) during subsequent play of the skilled-based casino game, awarding a portion of said over-hold pool based on randomness; (v) during a subsequent play of the skilled-based casino game, awarding a portion of said over-hold pool based on skilled play; and wherein said awards of a portion of said over-hold pool based on randomness and said awards of a portion of said over-hold pool based on skilled play contribute to a substantial equivalence between an actual return to player and a theoretical return to player.

* * * * *